(12) United States Patent
Adkins et al.

(10) Patent No.: US 7,179,882 B2
(45) Date of Patent: Feb. 20, 2007

(54) LOW VISCOSITY POLYMER POLYOLS

(75) Inventors: Rick L. Adkins, Hurricane, WV (US); Scott A. Guelcher, Weirton, WV (US); James R. Charron, Pittsburgh, PA (US); John E. Hayes, Gibsonia, PA (US)

(73) Assignee: Bayer Materialscience LLC, Pittsburgh, PA (US)

( * ) Notice: Subject to any disclaimer, the term of this patent is extended or adjusted under 35 U.S.C. 154(b) by 0 days.

(21) Appl. No.: 10/909,492

(22) Filed: Aug. 2, 2004

(65) Prior Publication Data

US 2006/0025491 A1    Feb. 2, 2006

(51) Int. Cl.
*C08G 63/02* (2006.01)

(52) U.S. Cl. .................... 528/272; 521/137; 521/138; 521/159; 522/60; 522/65; 522/90; 522/95; 524/765; 524/766; 525/55; 525/57; 525/77; 525/123; 528/75; 528/76; 528/85

(58) Field of Classification Search ............... 521/137, 521/138, 159; 522/60, 65, 90, 95; 524/765, 524/766; 525/55, 57, 77, 123; 528/75, 76, 528/85
See application file for complete search history.

(56) References Cited

U.S. PATENT DOCUMENTS

| | | | |
|---|---|---|---|
| 3,304,273 A | 2/1967 | Stamberger ............... 260/2.5 |
| 3,652,639 A | 3/1972 | Pizzini et al. ............ 260/465.4 |
| 3,823,201 A | 7/1974 | Pizzini et al. ............. 260/861 |
| 3,850,861 A | 11/1974 | Fabris et al. ............ 260/2.5 BE |
| 3,931,092 A | 1/1976 | Ramlow et al. ......... 260/33.4 R |
| RE28,715 E | 2/1976 | Stamberger .......... 260/33.2 R |
| RE29,118 E | 1/1977 | Stamberger ............ 260/2.5 BE |
| 4,014,846 A | 3/1977 | Ramlow et al. ........ 260/33.2 R |
| 4,093,573 A | 6/1978 | Ramlow et al. ........ 260/2.5 BE |
| 4,148,840 A | 4/1979 | Shah ....................... 260/859 R |
| 4,172,825 A | 10/1979 | Shook et al. .......... 260/33.2 R |
| 4,208,314 A | 6/1980 | Priest et al. ........... 260/33.2 R |
| 4,242,249 A * | 12/1980 | Van Cleve et al. ......... 524/769 |
| 4,342,840 A | 8/1982 | Kozawa et al. ............. 521/137 |
| 4,390,645 A | 6/1983 | Hoffman et al. ............ 521/137 |
| 4,394,491 A | 7/1983 | Hoffman ...................... 525/452 |
| 4,454,255 A | 6/1984 | Ramlow et al. ............ 521/137 |
| 4,458,038 A | 7/1984 | Ramlow et al. ............ 521/137 |
| 4,460,715 A | 7/1984 | Hoffman et al. ............ 521/137 |
| 4,550,194 A | 10/1985 | Reichel et al. .............. 560/200 |
| 4,652,589 A | 3/1987 | Simroth et al. ............. 521/137 |
| 4,745,153 A | 5/1988 | Hoffman ..................... 524/762 |
| RE32,733 E | 8/1988 | Simroth et al. ............. 521/137 |
| RE33,291 E | 8/1990 | Ramlow et al. ............ 521/137 |
| 4,997,857 A | 3/1991 | Timberlake et al. ........ 521/116 |
| 5,196,476 A * | 3/1993 | Simroth ...................... 524/769 |
| 5,814,699 A * | 9/1998 | Kratz et al. .................... 525/53 |
| 5,990,185 A * | 11/1999 | Fogg ......................... 521/112 |
| 6,013,731 A * | 1/2000 | Holeschovsky et al. .... 525/123 |
| 6,455,603 B1 * | 9/2002 | Fogg ......................... 521/137 |
| 6,624,209 B2 | 9/2003 | Kawamoto et al. ......... 521/137 |

FOREIGN PATENT DOCUMENTS

| | | |
|---|---|---|
| EP | 786 480 | 7/1923 |
| GB | 1126025 | 9/1968 |
| JP | 48-101494 | 12/1973 |
| JP | 52-5887 | 1/1977 |

* cited by examiner

*Primary Examiner*—Terressa Boykin
(74) *Attorney, Agent, or Firm*—Joseph C. Gil; N. Denise Brown

(57) ABSTRACT

The present invention relates to low viscosity polymer polyols and to a process for the preparation of these low viscosity polymer polyols. These polymer polyols comprise the free-radical polymerization product of (A) a base polyol, (B) a pre-formed stabilizer, and (C) at least one ethylenically unsaturated monomer, in the presence of (D) at least one free-radical polymerization initiator, and (E) at least one polymer control agent. The total amount of polymer control agent present in the polymer polyols of the present invention ranges from greater than about 5.0% up to about 20% by weight, based on 100% by weight of the polymer polyol.

24 Claims, No Drawings

LOW VISCOSITY POLYMER POLYOLS

BACKGROUND OF THE INVENTION

The present invention relates to low viscosity polymer polyols and to a process for their preparation. This invention also relates to a process for the production of polyurethane foams from these low viscosity polymer polyols, and to the resultant foams Polymer polyol compositions suitable for use in producing polyurethane foams, elastomers and the like, and the polyurethanes, are commercial products. The two major types of these polyurethane foams are termed slabstock and molded. Slabstock foams are used in the carpet, furniture and bedding industries. Primary uses of slabstock foam are as carpet underlay and furniture padding. In the molded foam area, high resiliency (HR) molded foam is the foam type generally made. HR molded foams are used in the automotive industry for a breadth of applications ranging from molded seats to energy-absorbing padding and the like.

The basic patents relating to such polymer polyol compositions are Stamberger, U.S. Pat. No. Re. 28,715 (reissue of U.S. Pat. No. 3,383,351) and U.S. Pat. No. Re. 29,118 (reissue of U.S. Pat. No. 3,304,273). As described therein, a stable dispersion of polymer particles in a polyol can be produced by polymerizing one or more ethylenically unsaturated monomer dissolved or dispersed in a polyol in the presence of a free radical catalyst.

Initially, the primary polymer polyol compositions accepted commercially used acrylonitrile in its manufacture. Many of these compositions possessed undesirably high viscosities for certain applications. More recently, acrylonitrile-styrene monomer mixtures have been used commercially to make the polymer component of polymer polyols. The expanding demand for polymer polyols has highlighted several product needs and this has spawned additional advances in technology.

Polymer polyols derived from such high styrene monomer mixtures appear incapable of satisfying ever-increasing market needs, which include rigorous stability requirements and increased load-bearing characteristics in foams. Polymer polyols with increased load-bearing characteristics can be obtained by increasing their polymer or solid contents. Solid contents of 30 to 60 weight percent, or higher, are desired. Yet, the art has not been capable of increasing solid contents without reducing the stability of the polymer polyol and undesirably increasing its viscosity.

Employment of high styrene monomer mixtures and high solid content polymer polyols, by prior practices, generally resulted in undesirably high viscosity polymer polyols. The viscosity of a polymer polyol should be sufficiently low for ease of handling during its manufacture. In addition, the viscosity should facilitate transport, handling and, ultimately, adequate processability, in the employed foam processing equipment. Because of increased use of sophisticated mixing systems, such as impingement systems, excessive viscosity of the polymer polyol is becoming a significant problem. The need for lower viscosity polymer polyols is apparent to satisfy these increased demands in the art.

As indicated, polymer polyol stability is a concern to makers of polyurethanes. At one time, seediness or filterability, a measure of stability of polymer polyols, was not a major issue in commercial practices. However, advances in the state of the art of polyurethane production have resulted in revisions in polymer polyol stability criteria, especially in the molded foam area.

With commercial developments in sophisticated, high-speed and large-volume equipment and systems for handling, mixing and reacting polyurethane-forming ingredients have evolved the need for highly stable and low viscosity polymer polyols. Polymer polyols have certain minimum requirements for satisfactory processing in such sophisticated foam equipment. Typically, the prime requirement is that the polymer polyols possess sufficiently small particles so that filters, pumps and the like do not become plugged or fouled in relatively short periods of time.

Though there have been advances in reduction in viscosity and increase in solids of polymer polyols, there remains a need for improvement in viscosity reduction and increase in solids content. Greater reductions in viscosity are needed to meet market demands and greater effective increases in solids content are also needed by the market. More importantly, there is a need for technology in polymer polyols that maximizes viscosity reduction while also providing a viable mechanism to higher solids content.

U.S. Pat. No. 4,208,314 describes low viscosity polymer polyols made from acrylonitrile-styrene monomer mixtures. These polymer polyols are convertible to low density, water-blown polyurethane foams having reduced scorch, especially with relatively low acrylonitrile-to-styrene ratios. This reference also discloses a process for making polymer polyols with reduced particulates.

Enhanced stability of polymer polyols is believed to be provided by the presence of a minor amount of a graft or addition copolymer formed in situ from growing polymer chains and polyol molecules. Some prior approaches incorporate small amounts of unsaturation into the polyol in addition to that inherently present in the polyoxyalkylene polyols typically used in forming polymer polyols. It was believed that improved stability resulted due to an increased amount of an addition copolymer stabilizer expected to be formed. U.S. Pat. Nos. 3,652,639, 3,823,201, and 3,850,861, British Patent 1,126,025 and Japanese Patent Nos. 52-005887 and 48-101494 utilize this approach. The use of "stabilizer precursors," also termed a "macromer" that contains a particular level of reactive unsaturation, is based on the expectation that during polymerization, in the preparation of the polymer polyol, adequate amounts of stabilizer will be formed by the addition polymerization of the precursor stabilizer with a growing polymer chain.

The general concept of using stabilizer precursors in polymerization is disclosed in, for example, U.S. Pat. Nos. 4,454,255 and 4,458,038. The macromer in these patents may be obtained by reacting a polyol with a compound having reactive ethylenic unsaturation such as, for example, maleic anhydride or fumaric acid. Another reference which describes this technique is U.S. Pat. No. 4,460,715. The reactive unsaturation in the '715 stabilizer is provided by an acrylate or methacrylate moiety.

U.S. Pat. No. 4,242,249 discloses improved polymer polyols prepared by utilizing certain preformed dispersants or preformed stabilizers. These polymer polyols provide stability satisfactory for commercial production, and use of at least one of the following: (1) higher amounts of styrene or other comonomer when acrylonitrile copolymer polymer polyols are being prepared, (2) higher polymer contents or (3) lower molecular weight polyols.

Other references which describe stabilizer precursors (or macromers) for polymer polyols include, for example, U.S. Pat. Nos. 4,550,194, 4,652,589, and 4,997,857. The stabilizer precursors of U.S. Pat. No. 4,997,857 are characterized by these four features: (1) they are prepared from a starting polyol having a functionality greater than 4;(2) they have at least 60% retained unsaturation; (3) they have viscosities greater than 2000 centipoise at 25° C.; and (4) the starting polyol is capped with ethylene oxide and/or the adduct formed between the starting polyol and the a reactive unsaturated compound is capped with ethylene oxide.

Other references which describe polymer polyols and/or processes of making polymer polyols include, for example, Simroth et al., U.S. Pat. No. Re. 32,733;Ramlow et al., U.S. Pat. No. 3,931,092; Ramlow et al., U.S. Pat. No. 4,014,846; Ramlow et al., U.S. Pat. No. 4,093,573; Shah, U.S. Pat. No. 4,148,840; Shook et al., U.S. Pat. No. 4,172,825; Kozawa et al., U.S. Pat. No. 4,342,840; Hoffman et al., U.S. Pat. No. 4,390,645; Hoffman, U.S. Pat. No. 4,394,491; Ramlow et al., U.S. Pat. No. 4,454,255; Ramlow et al., U.S. Pat. No. 4,458,038; and Hoffman, U.S. Pat. No. 4,745,153.

A pre-formed stabilizer (PFS) is particularly useful for preparing a polymer polyol having a lower viscosity at a high solids content. In the pre-formed stabilizer processes, a macromer is reacted with monomers to form a co-polymer of composed of macromer and monomers. These co-polymers comprising a macromer and monomers are commonly referred to as pre-formed stabilizers (PFS). Reaction conditions may be controlled such that a portion of the co-polymer precipitates from solution to form a solid. In many applications, a dispersion having a low solids content (e.g., 3 to 15% by weight) is obtained. Preferably, the reaction conditions are controlled such that the particle size is small, thereby enabling the particles to function as "seeds" in the polymer polyol reaction.

For example, U.S. Pat. No. 5,196,476 discloses a pre-formed stabilizer composition prepared by polymerizing a macromer and one or more ethylenically unsaturated monomers in the presence of a free-radical polymerization initiator and a liquid diluent in which the pre-formed stabilizer is essentially insoluble. EP 0,786,480 discloses a process for the preparation of a pre-formed stabilizer by polymerizing, in the presence of a free-radical initiator, from 5 to 40% by weight of one or more ethylenically unsaturated monomers in the presence of a liquid polyol comprising at least 30% by weight (based on the total weight of the polyol) of a coupled polyol which may contain induced unsaturation. These pre-formed stabilizers can be used to prepare polymer polyols which are stable and have a narrow particle size distribution. The coupled polyol is necessary to achieve a small particle size in the pre-formed stabilizer, which preferably ranges from 0.1 to 0.7 micron. U.S. Pat. Nos. 6,013,731 and 5,990,185 also disclose pre-formed stabilizer compositions comprising the reaction product of a polyol, a macromer, at least one ethylenically unsaturated monomer, and a free radical polymerization initiator.

Polymer control agents, also commonly called reaction moderators, are well known and are commonly used in the preparation of polymer polyols as is described in, for example, U.S. Pat. No. Re 33,291, (reissue of U.S. Pat. No. 4,454,255), U.S. Pat. Nos. 4,652,589, 5,196,476, 5,814,699, 5,990,185, and 6,455,603. Preformed stabilizers are used in the polymer polyols of U.S. Pat. Nos. 5,196,476 and 5,990,185, however, these do not use greater than 5% by weight of a polymer control agent. In fact, the trend has been towards decreasing the quantity of polymer control agent in making polymer polyols as in U.S. Pat. No. 6,455,603. Decreasing the amount of PCA decreases the amount of volatiles that need to be stripped at the end of the reaction. In addition, it was previously thought that too high of a level of PCA resulted in polyurethane foams with decreased physical properties. Thus, the quantity of PCA was kept below 5% by weight.

U.S. Pat. No. 4,652,589 describes preparative techniques that allow a polymer polyol to be prepared with the "indigenous viscosity" for the particular system, i.e. the minimum product viscosity for a given polymer polyol under the particular reaction conditions. This reduction in product viscosity is accompanied by an observable change in the somewhat rough surfaces of the polymer particles to a predominance (i.e. at least a majority) of particles appearing to have relatively smooth exterior surfaces. The general concept of these techniques is to increase the fluidity of the particles to obtain at least a predominance of smooth particles with a concurrent reduction in product viscosity. Increased fluidity can be obtained by, for example, the presence of a polymer control agent. This is illustrated in Example 9 of U.S. Pat. No. 4,652,589. Example 9 prepares a polymer polyol by feeding polyol, catalyst, styrene, acrylonitrile, a macromer, and 4.6% methanol (a PCA), based on the total weight of the reactor feeds, to a continuous-stirred tank reactor. This amount of methanol is sufficient to produce a polymer polyol in which the vast majority of the particles had relatively smooth surfaces, and the polymer polyols is therefore assumed to have its lowest viscosity or "indigenous" viscosity.

Surprisingly, and contrary to the disclosure of U.S. Pat. No. 4,652,589, we have found that increasing the level of polymer control agent above the level which is sufficient to produce a majority of smooth particles effects a further reduction in the viscosity of the polymer polyol. The exact mechanism by which the additional polymer control agent lowers the viscosity of a polymer polyol that, except for the added PCA, would already have smooth particle surfaces and thus exhibit its "indigenous" viscosity is not completely understood. Furthermore, it was surprisingly found that increasing the quantity of PCA enables the preparation of a higher solids content polymer polyol with a lower viscosity while maintaining good filterability. Thus, it appears that the higher levels of PCA are more effective at higher solids contents.

SUMMARY OF THE INVENTION

This invention relates to low viscosity polymer polyols and to a process for the preparation of these low viscosity polymer polyols. The present invention also relates to a process for the production of polyurethane foams from these low viscosity polymer polyols and to the resultant polyurethane foams.

The low viscosity polymer polyols of the present invention are the free-radical polymerization product of (A) a base polyol, (B) a pre-formed stabilizer, and (C) at least one ethylenically unsaturated monomer, in the presence of (D) a free-radical polymerization initiator, and (E) at least one polymer control agent, with the total amount of polymer control agent present in the polymer polyol ranging from greater than about 5.0% up to about 20% by weight, based on 100% by weight of the polymer polyol. The total amount of polymer control agent comprises:

(i) from about 0% to about 95% by weight, based on 100% by weight of (i) and (ii), of polymer control agent from the preformed stabilizer and which is carried into the polymer polyol by the PFS, and (ii) from greater than about 5% to about 100% by weight, based on 100% by weight of (i) and (ii), of polymer control agent which is added separately from the pre-formed stabilizer.

The %'s by weight of of (i) and (ii) totals 100% by weight of the total amount of polymer control agent present in the polymer polyol.

In a preferred embodiment of the invention, the resultant stripped polymer polyol has a viscosity$\leq V_b e^{(2.4x)}$ at 25° C., wherein:

$V_b$=viscosity of base polyol in centistokes (cSt), and

X=weight % of solids in polymer polyol/(100–weight % of solids in the polymer polyol).

The process of the present invention for preparing these low viscosity polymer polyols comprises (1) free-radically polymerizing (A) a base polyol, (B) a pre-formed stabilizer and (C) at least one ethylenically unsaturated monomer, in the presence of (D) a free-radical polymerization initiator, and (E) at least one polymer control agent, of added polymer control agent; with the total amount of polymer control agent present in the polymer polyol ranging from greater than about 5.0% up to about 20% by weight, based on 100% by weight of the polymer polyol. The total amount of polymer control agent comprises:

(i) from about 0% to about 95% by weight, based on 100% by weight of (i) and (ii), of polymer control agent from the preformed stabilizer and which is carried into the polymer polyol by the PFS, and (ii) from greater than about 5% to about 100% by weight, based on 100% by weight of (i) and (ii), of polymer control agent which is added separately from the pre-formed stabilizer;

with the % by weight of of (i) and (ii) totaling 100% by weight of the total amount of polymer control agent present in the polymer polyol.

Also, in a preferred embodiment, the process of the present invention additionally comprises (2) stripping the resultant polymer polyol. The resultant stripped polymer polyol has a viscosity$\leq V_b e^{(2.4x)}$ at 25° C., wherein:

$V_b$=viscosity of base polyol in centistokes (cSt), and

X=weight % of solids in polymer polyol/(100–weight % of solids in the polymer polyol).

The process for the production of polyurethane foams comprises (I) reacting (1) a polyisocyanate component, with (2) an isocyanate-reactive component comprising the low viscosity polymer polyols of the present invention, in the presence of (3) at least one catalyst, and (4) at least one blowing agent.

The polyurethane foams of the present invention comprise the reaction product of (1) a polyisocyanate component, with (2) an isocyanate-reactive component comprising the low viscosity polymer polyols of the present invention, in the presence of (3) at least one catalyst, and (4) at least one blowing agent.

DETAILED DESCRIPTION OF THE INVENTION

As used herein, the following terms shall have the following meanings.

The term "monomer" means the simple unpolymerized form of chemical compound having relatively low molecular weight, e.g., acrylonitrile, styrene, methyl methacrylate, and the like.

The phrase "free radically polymerizable ethylenically unsaturated monomer" means a monomer containing ethylenic unsaturation (>C=C<, i.e. two double bonded carbon atoms) that is capable of undergoing free radically induced addition polymerization reactions.

The term pre-formed stabilizer is defined as an intermediate obtained by reacting a macromer containing reactive unsaturation (e.g. acrylate, methacrylate, maleate, etc.) with monomers (i.e. acrylonitrile, styrene, methyl methacrylate, etc.), optionally, in a polymer control agent, PCA, (i.e. methanol, isopropanol, toluene, ethylbenzene, etc.) and/or optionally, in a polyol, to give a co-polymer (dispersion having e.g. a low solids content (e.g. <20%), or soluble grafts, etc.).

The term "stability" means the ability of a material to maintain a stable form such as the ability to stay in solution or in suspension.

The phrase "polymer polyol" refers to such compositions which be produced by polymerizing one or more ethylenically unsaturated monomers dissolved or dispersed in a polyol in the presence of a free radical catalyst to form a stable dispersion of polymer particles in the polyol. These polymer polyols have the valuable property of imparting to, for example, polyurethane foams and elastomers produced therefrom, higher load-bearing properties than are provided by the corresponding unmodified polyols.

As used herein "viscosity" is in centistokes (cSt) measured at 25° C. on a Cannon Fenske viscometer.

Suitable polyols to be used as the base polyols in the present invention include, for example, polyether polyols. Suitable polyether polyols include those having a functionality of at least about 2, preferably at least about 2, and more preferably at least about 3. The functionality of suitable polyether polyols is less than or equal to about 8, preferably less than or equal to about 6, and most preferably less than or equal to about 5. The suitable polyether polyols may also have functionalities ranging between any combination of these upper and lower values, inclusive. The OH numbers of suitable polyether polyols is at least about 10, preferably at least about 15, and most preferably at least about 20. Polyether polyols typically also have OH numbers of less than or equal to about 180, preferably less than or equal to about 150, more preferably less than or equal to about 100, and most preferably less than or equal to about 75. The suitable polyether polyols may also have OH numbers ranging between any combination of these upper and lower values, inclusive. The (number average) molecular weights of suitable polyether polyols is typically greater than about 600, preferably at least about 2,000 and most preferably at least about 3,000. Polyether polyols typically have (number average) molecular weights of less than or equal to 15,000, more preferably less than or equal to 12,000 and most preferably less than or equal to 8,000. The suitable polyether polyols may also have (number average) molecular weights ranging between any combination of these upper and lower values, inclusive.

These polyether polyols may also have functionalities ranging from about 2 to about 8, preferably from about 2 to about 6, and most preferably from about 3 to about 5;OH numbers ranging from about 10 to 180, preferably from about 15 to about 150, more preferably from about 15 to about 100, and most preferably from about 20 to about 75;and (number average) molecular weights ranging from greater than 600 to about 15,000, preferably about 2,000 to 12,000 and most preferably about 3,000 to 8,000.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH = (56.1 \times 1000 \times f)/\text{mol. wt.}$$

wherein:
OH: represents the hydroxyl number of the polyol,
f: represents the functionality of the polyol, i.e. the average number of hydroxyl groups per molecule of polyol,
and
mol. wt. represents the molecular weight of the polyol.

Examples of such compounds include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylolpropane, glycerol, pentaerythritol, sorbitol, sucrose, ethylenediamine, toluene diamine, etc. By alkoxylation of the starter, a suitable polyether polyol for the base polyol component can be formed. The alkoxylation reaction may be catalyzed using any conventional catalyst including, for example, potassium hydroxide (KOH) or a double metal cyanide (DMC) catalyst.

Other suitable polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2, 4-tirhydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference. Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris (hydroxy-phenyl)propanes, condensation products of various phenolic compounds and glyoxal, glutaraldehyde, other dialdehydes, including the 1,1,2,2-tetrakis (hydroxyphenol) ethanes, etc.

The alkylene oxide adducts of phosphorus and polyphosphorus acid are also useful polyols, These include ethylene oxide, 1,2-epoxypropane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

It should also be appreciated that blends or mixtures of various useful polyols may be used if desired. With polyols other than the preferred type, useful monomer contents and monomer or monomers may vary somewhat. Similarly, it may be desirable or even necessary to modify the stabilizer of this invention when such other polyols are used. This can be accomplished by following the criteria discussed hereinafter in connection with the stabilizers used for the preferred polyols.

Suitable preformed stabilizers for the present invention are preformed stabilizers which are known in the art and include without limitation those described in the references discussed herein. Preferred preformed stabilizers include those discussed in, for example, U.S. Pat. No. 4,148,840 (Shah), U.S. Pat. No. 5,196,476 (Simroth), U.S. Pat. No. 5,364,906 (Critchfield) U.S. Pat. No. 5,990,185 (Fogg), U.S. Pat. No. 6,013,731 (Holeschovsky et al), and U.S. Pat. No. 6,455,603 (Fogg), the disclosures of which are herein incorporated by reference.

Suitable preformed stabilizers herein include those so-called intermediate obtained by reacting a macromolecule with one or more monomers (i.e. acrylonitrile, styrene, methyl methacrylate, etc.), to give a copolymer (dispersion having a low solids content, e.g. <25% or soluble grafts, etc.). The macromolecule may be obtained by linkage of polyether polyols through coupling with a material such as a polyisocyanate, epoxy resin, etc. or by other means to produce a high molecular weight polyol. The macromolecule preferably contains reactive unsaturation and is, in general, prepared by the reaction of the selected reactive unsaturated compound with a polyol. The terminology "reactive unsaturated compound," refers to any compound capable of forming an adduct with a polyol, either directly or indirectly, and having carbon-to-carbon double bonds which are adequately reactive with the particular monomer system being utilized. More specifically, compounds containing alpha, beta unsaturation are preferred. Suitable compounds satisfying this criteria include the maleates, fumarates, acrylates, and methacrylates. While not alpha, beta unsaturated compounds, polyol adducts formed from substituted vinyl benzenes, such as chloromethylstyrene, likewise may be utilized. Illustrative examples of suitable alpha, beta unsaturated compounds which may be employed to form the precursor stabilizer include maleic anhydride, fumaric acid, dialkyl fumarates, dialkyl maleares, glycol maleares, glycol fumarates, isocyanatoethyl methacrylate, 1,1-dimethyl-m-isopropenylbenzyl-isocyanate, methyl methacrylate, hydroxyethyl methacrylate, acrylic and methacrylic acid and their anhydride, methacroyl chloride and glycidyl methacrylate. The level of ethylenic unsaturation in the precursor stabilizer may vary widely. The minimum and maximum levels of unsaturation both are constricted by the dispersion stability that the precursor stabilizer is capable of imparting to the polymer polyol composition. The specific level of unsaturation utilized further will depend on the molecular weight and functionality of the polyol used to prepare the precursor stabilizer. Optionally, a diluent, polymer control agent or chain transfer agent molecular weight regulator may be present.

Suitable preformed stabilizers for the present invention also include those which comprise the free radical polymerization product of (1) a free radically polymerizable ethylenically unsaturated monomer and (2) an adduct of a alcohol having the average formula:

A(OROX)$_{\geq 1}$ wherein A is a polyvalent organic moiety, the free valence of which is $\geq 1$, R is the divalent residue comprising an alkylene oxide moiety, and X is one or more of an organic moiety containing reactive unsaturation, copolymerizable with (A), and hydrogen, about one of such X is the organic moiety containing reactive unsaturation and the remaining X's are hydrogen, in which the adduct may be further adducted with an organic polyisocyanate.

Other suitable preformed stabilizers include those which are prepared using as precursor stabilizers compounds obtained by reacting a silicon atom containing compound corresponding to one or the formulas:

R$_n$SiX$_{4-n}$ or R$_n$Si((—OSi(R$^1$)$_2$)$_p$X)$_{4-n}$ wherein:
  each R: independently represent saturated or unsaturated hydrocarbyl groups, with at least one R group being an olefinically unsaturated hydrocarbyl group,
  R1: represents a hydrocarbyl group,
  X: represents a C$_1$ to C$_{10}$ alkoxy group,
  n: represents an integer from 1 to 3,
  and
  p: is an integer greater than zero;

with a polyether polyol having an average molecular weight in excess of 400 and a hydroxyl number in the range of 20 to 280. Of these, the preferred precursor stabilizers are the reaction products of vinyltrimethoxy silane, vinyltriethoxy silane or vinyltripropoxy silane with a polyether polyol having an average molecular weight in excess of 400 and a hydroxyl number in the range of 20 to 280. Such precursor stabilizers are described in U.S. Pat. No. 4,883,832 (Cloetens et al), the disclosure of which is herein incorporated by reference.

Among the preferred preformed stabilizers are those which are described in, for example, U.S. Pat. No. 5,990,185, the disclosure of which is herein incorporated by reference, wherein a PFS is prepared by reacting a polyol, a precursor stabilizer, a monomer and a free-radical polymerization initiator to a reaction zone maintained at a temperature sufficient to initiate free radical polymerization, and under sufficient pressure to maintain only liquid phases in the reaction zone, for a period of time sufficient to react essentially all of the precursor stabilizer and recovering a heterogeneous mixture containing the preformed stabilizer composition.

The preformed stabilizer of the invention is derived from the following composition, comprising:
(1) a macromolecule, macromer or other suitable precursor stabilizer;
(2) a free radically polymerizable ethylenically unsaturated monomer, preferably acrylonitrile and at least one other ethylenically unsaturated comonomer copolymerizable therewith;
(3) a free radical polymerization initiator;
(4) optionally, a polymer control agent in which (1), (2), and (3) are soluble, but in which the resultant preformed stabilizer is essentially insoluble;

and/or
(5) optionally, one or more polyols.

As described in, for example, U.S. Pat. No. 5,196,476, the disclosure of which is herein incorporated by reference, suitable preformed stabilizers can be prepared by reacting a combination of components (1), (2), (3), and, optionally (4) and/or optionally (5), above, in a reaction zone maintained at a temperature sufficient to initiate a free radical reaction, and under sufficient pressure to maintain only liquid phases in the reaction zone, for a sufficient period of time to react (1), (2) and (3); and recovering a mixture containing the preformed stabilizer dispersed in the polymer control agent.

Suitable compounds to be used as the macromolecule, the macromer or the precursor stabilizer (i.e. component (1) above) include, for example, compounds which contain reactive unsaturation (e.g. acrylate, methacrylate, maleate, fumarate, isopropenylphenyl, vinyl silyl, etc.), obtained by reacting compounds containing reactive unsaturation with alcohols having the average formula A(OROX)$_{\geq 1}$. Examples of unsaturation containing compounds include but are not limited to, maleic anhydride, fumaric acid, dialkyl fumarates, dialkyl maleates, glycol maleates, glycol fumarates, isocyanatoethyl meth-acrylate, methyl methacrylate, hydroxyethyl methacrylate, acrylic and methacrylic acid and their anhydride, methacryl chloride, and glycidyl methacrylate, vinylmethoxysilane, etc.

The reactive unsaturated compound may also be the reaction product of one or more molecules resulting in a structure with the desired qualities of a reactive unsaturated compound. For example, hydroxymethyl or hydroxyethyl methacrylate can be reacted with a polyol by way of coupling through use of an organic polyisocyanate as described in, for example, U.S. Pat. No. 4,521,546, the disclosure of which is herein incorporated by reference, or by reaction with an unsaturated mono-isocyanate such as, for example, 1,1-dimethyl-m-isopropenylbenzyl isocyanate, etc.

Suitable compounds to be used component (2) above, include reactive unsaturated compounds, particularly those that are free radically polymerizable. Some examples of suitable compounds include aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable to be employed in making the pre-formed stabilizer. Of the above monomers, the monovinylidene aromatic monomers, particularly styrene, and the ethylenically unsaturated nitriles, particularly acrylonitrile are preferred.

It is preferred that (2) is acrylonitrile and at least one other ethylenically unsaturated comonomer copolymerizable with acrylonitrile. Illustrations of ethylenically unsaturated comonomer copolymerizable with acrylonitrile include styrene and its derivatives, acrylates, methacrylates such as methyl methacrylate, vinylidene chloride, and the like.

It is particularly preferred to utilize acrylonitrile with a comonomer and to maintain a minimum of about 5 to 15 percent by weight acrylonitrile in the system. Styrene will generally be preferred as the comonomer, but methyl methacrylate or other monomers may be employed in place of part or all of the styrene. A preferred monomer mixture (2) used to make the preformed stabilizer composition (B) comprises mixtures of acrylonitrile and styrene. The weight proportion of acrylonitrile can range from about 20 to 80 weight percent of the comonomer mixture, more typically from about 30 to about 40 weight percent, and styrene can accordingly vary from about 80 to about 20 weight percent, more preferably from 70 to 60 weight percent of the mixture. An acrylonitrile to styrene ratio in the monomer mixture of from about 25:75 to 60:40 is particularly preferred, even more particularly about 30:70 to 55:45.

When using a mixture of monomers, it is preferred to use a mixture of two monomers. These monomers are typically used in weight ratios of from 80:20 (styrene:acrylonitrile) to 20:80 (S:AN), and preferably of from 75:25 (S:AN) to 45:55 (S:AN).

The free radical polymerization initiators suitable for use as component (3) in the suitable preformed stabilizers of the present invention encompass any free radical catalyst suitable for grafting of an ethylenically unsaturated polymer to a polyol. Examples of suitable free-radical polymerization initiators for the present invention include initiators such as, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful catalysts also include, for example, those catalysts having a satisfactory half-life within the temperature ranges used to form the preformed stabilizer, i.e. the half-life should be about 25 percent or less of the residence time in the reactor at a given temperature. Representative examples of useful catalyst species include t-butyl peroxy-2-ethylhexanoate, t-butylperpivalate, t-amyl peroctoate, 2,5-dimethylhexane-2,5-di-per-2-ethyl hexoate, t-butylperneodecanoate, and t-butylperbenzoate. Useful also are the azo catalysts such as azobis-isobutyronitrile, 2,2'-azo bis-(2-methylbutyronitrile), and mixtures thereof. The preferred free radical catalysts are peroxides such as tertiary butyl peroctoate.

Suitable catalysts concentrations range from about 0.01 to about 2% by weight, preferably from about 0.05 to 1% by weight, and most preferably 0.05 to 0.3% by weight, based on the total weight of the components (i.e. 100% by weight of the combined weight of the macromer, the ethylenically unsaturated monomer, the free-radical polymerization initiator and, optionally the liquid diluent and/or the polymer control agent). Up to a certain point, increases in the catalyst concentration result in increased monomer conversion and grafting; but further increases do not substantially increase conversion. Catalyst concentrations which are too high can cause cross-linking in the preformed stabilizer (B). The particular catalyst concentration selected will usually be an optimum value considering all factors, including costs.

In accordance with the present invention, a polymer control agent (4) in which components (1), (2), and (3) of the pre-formed stabilizer are soluble, but in which the resultant preformed stabilizer (B) is essentially insoluble, is optional. When present, this may be one polymer control agent or a mixture of polymer control agents.

Suitable compounds to be used as polymer control agents in accordance with the present invention include various mono-ols (i.e. monohydroxy alcohols), aromatic hydrocarbons, ethers, and other liquids. As long as the compound used as the polymer control agent does not adversely affect the performance of the preformed stabilizer (B), it is suitable for use in the practice of the invention. Preferred are the mono-ols because of their ease of stripping from the final polymer/polyol composition. Mixtures of one or more mono-ols may be used as polymer control agents. The choice of mono-ol is not narrowly critical. It should not form two phases at reaction conditions and should be readily stripped from the final polymer/polyol.

The selection of mono-ol is typically an alcohol containing at least one carbon atom, such as methanol, ethanol, n-propanol, iso-propanol, n-butanol, sec.-butanol, t-butanol, n-pentanol, 2-pentanol, 3-pentanol, and the like, and mixtures of the same. The preferred mono-ol is isopropanol. The concentration of polyol in the polymer control agent (4) if used, is limited to an amount below which gelling occurs in preformed stabilizer (B).

The polyol components suitable as component (5) in the present invention include typically the alkylene oxide adduct of $A(OH)_{>3}$ described above. Though the polyol used as component (5) can encompass the variety of polyols described above, including the broader class of polyols described in U.S. Pat. No. 4,242,249, at column 7, line 39 through column 9, line 10, the disclosure of which is herein incorporated by reference, it is preferred that the polyol component (5) be the same as or equivalent to the polyol used in the formation of precursor used to prepare the preformed stabilizer (PFS). Typically, the polyol need not be stripped off.

Because of the number of components, the variability of their concentration in the feed, and the variability of the operating conditions of temperature, pressure, and residence or reaction times, a substantial choice of these is possible while still achieving the benefits of the invention. Therefore, it is prudent to test particular combinations to confirm the most suitable operating mode for producing a particular final polymer polyol product.

In general, the amount of the components in the formulation, on a weight percent of the total formulation for forming preformed stabilizer (B), is as follows:

| Component of Formulation | Amount, weight % |
|---|---|
| 1 | about 10 to 40 |
| 2 | about 10 to 30 |
| 3 | about 0.01 to 2 |
| 4 | about 30 to 80 |
| 5 | about 0 to 40 |

A preferred formulation for forming the preformed stabilizer (B) is as follows:

| | |
|---|---|
| 1: | 10 to 40, more preferably 15 to 35; |
| 2 | 10 to 30, more preferably 15 to 25; |
| 3 | 0.1 to 2, more preferably 0.1 to 2, |
| 4 | 30 to 80, more preferably 40 to 70 |
| 5 | 0 to 20, more preferably 0 to 10 |

In the formulations proposed above for the preformed stabilizer (B), the %'s by weight of components 1, 2, 3, and optionally 4, and optionally 5, totals 100% by weight of component (B), the preformed stabilizer.

The process for producing the preformed stabilizer (B) is similar to the process for making the polymer polyol. The temperature range is not critical and may vary from about 80° C. to about 150° C. or perhaps greater, the preferred range being from 115° C. to 125° C. The catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.—a stirred flask or stirred autoclave). The reactors of this type keep the reaction mixture relatively homogeneous and so prevent localized high monomer to macromer ratios such as occur in tubular reactors, where all of the monomer is added at the beginning of the reactor.

The preformed stabilizer (B) of the present invention comprise dispersions in the diluent and any unreacted monomer in which the preformed stabilizer (B) is probably present as individual molecules or as groups of molecules in "micelles," or on the surface of small polymer particles.

Suitable compounds to be used as the ethylenically unsaturated monomers, i.e. component (C) the present invention include, for example, those ethylenically unsaturated monomers described above with respect to the preformed stabilizer. Suitable monomers include, for example, aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred that styrene and acrylonitrile are used in sufficient amounts such that the weight ratio of styrene to acrylonitrile (S:AN) is from about 80:20 to 40:60, more preferably from about 75:25 to 60:40. These ratios are suitable for polymer polyols and the processes of preparing them, regardless of whether they comprise the ethylenically unsaturated macromers or the pre-formed stabilizers of the present invention.

Overall, the quantity of ethylenically unsaturated monomer(s) present in the polymer polyols comprising a preformed stabilizer is preferably at least about 30% by weight, more preferably at least about 40% by weight, and most preferably at least about 45% by weight, based on 100% by weight of the polymer polyol. The quantity of ethylenically unsaturated monomer(s) present in the polymer polyols is preferably about 65% by weight or less, more preferably at least about 60% by weight or less. The polymer polyols of the present invention typically has a solids content ranging between any combination of these upper and lower values, inclusive, e.g. from 30% to 65% by weight, preferably from 30% to 60% by weight, based on the total weight of the polymer polyol. It is more preferred that the solids content be less than 60% by weight, more particularly preferred that the solids content be less than or equal to about 59% by weight, most preferred that the solids content be less than or equal to about 58% by weight, and most particularly preferred that the solids content be less than or equal to about 55% by weight.

Suitable free-radical initiators to be used as component (D) in the present invention include, for example, those as described previously for the formation of the preformed stabilizers. Examples of suitable free-radical polymerization initiators for the present invention include initiators such as, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful initiators also include, for example, those catalysts having a satisfactory half-life within the temperature ranges used in forming the polymer polyol. Typically, the half-life of the catalyst should be about 25% or less of the residence time in the reactor at any given time. Preferred initiators for this portion of the invention include acyl peroxides such as didecanoyl peroxide and dilauroyl peroxide, alkyl peroxides such as t-butyl peroxy-2-ethylhexanoate, t-butylperpivalate, t-amyl peroxy pivalate, t-amyl peroctoate, 2,5-dimethylhexane-2,5-di-per-2-ethyl hexoate, t-butyl perneodecanoate, t-butylper-benzoate and 1,1-dimethyl-3-hydroxybutyl peroxy-2-ethylhexanoate, and azo catalysts such as azobis (isobutyronitrile), 2,2'-azo bis-(2-methoxyl-butyronitrile), and mixtures thereof. Most preferred are the acyl peroxides described above and the azo catalysts. A particularly preferred initiator comprises azobis(isobutyronitrile).

Particularly preferred in the practice of the invention, are the use of azo catalysts and the aforementioned acyl peroxides of the above formula. The preferred acyl peroxides include those which have the unique advantage of effecting the desired degree of polymerization essentially without raising the viscosity of the polymer polyol over that obtained with the azo catalyst. This enhances one's ability to achieve higher solids polymer polyols with good product stability without raising product viscosity. Such acyl peroxides can be used in molar amounts substantially less than the amounts required when using other free radical catalysts in forming the polymer polyols.

Generally speaking, peroxide initiators result in the formation of little to no by-products which can result in solid precipitates in the refining section of a polymer polyol production unit. Such solid by-products are commonly formed by azo initiators such as, for example, AIBN, which forms TMSN (i.e.tetramethyl succinonitrile). Other drawbacks of azo initiators include the toxicity of TMSN and the difficulty of stripping TMSN from the final product (i.e. polymer polyol). When foams are made from polymer polyols which contain an azo initiator, residues of these can escape and may form an undesirable film on nearby surfaces such as, for example, the inside of an automobile windshield. Another problem is that a majority of the peroxide initiators (including most acyl peroxides) raise the viscosity of the resultant polymer polyols. However, this disadvantage is offset by the elimination of TMSN from the resultant polymer polyols.

The quantity of free-radical initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Suitable polymer control agents for use as component (E) in the present invention include, for example, those known to be useful in polymer polyols and the processes of preparing polyols such as those described in, for example, U.S. Pat. Nos. 3,953,393, 4,119,586, 4,463,107, 5,324,774, 5,814,699 and 6,624,209, the disclosures of which are herein incorporated by reference. Some examples of suitable compounds to be used as polymer control agents include various mono-ols (i.e. monohydroxy alcohols), aromatic hydrocarbons, ethers, and other liquids.

Polymer control agents are also commonly referred to as reaction moderators. These are known to control the molecular weight of the polymer polyol. As long as the compound used as the polymer control agent does not adversely affect the performance of the polymer polyol, it is suitable for use in the practice of the invention. Preferred are the mono-ols because of their ease of stripping from the final polymer/polyol composition. Mixtures of one or more mono-ols may be used as polymer control agents. The choice of mono-ol is not narrowly critical. It should not form two phases at reaction conditions and should be readily stripped from the final polymer/polyol.

Suitable polymer control agents include, for example, one or more mono-ol which is typically an alcohol containing at least one carbon atom, such as methanol, ethanol, n-propanol, iso-propanol, n-butanol, sec.-butanol, t-butanol, n-pentanol, 2-pentanol, 3-pentanol, allyl alcohol, and the like, and mixtures of the same. The preferred mono-ol is isopropanol. Other known polymer control agents include compounds such as, for example, ethylbenzene and toluene. In accordance with the present invention, the most preferred polymer control agents include isopropanol, ethanol, tert-butanol, toluene, ethylbenzene, etc.

The total amount of polymer control agent (PCA) present in the polymer polyols of the present invention ranges from greater than about 5.0% to about 20% by weight, based on the total weight of the polymer polyol. The total amount of polymer control agent is comprised of: (i) polymer control agent which is present in the preformed stabilizer and which is carried into the polymer polyol by the PFS due to use of PFS in the preparation of the polymer polyol, and (ii) polymer control agent which is added separately from the preformed stabilizer to the preparation of the polymer polyol. More specifically, the total amount of polymer control agent comprises (i) from 0 to about 95% by weight, based on 100% by weight of (i) and (ii), of polymer control agent from the preformed stabilizer and which is carried into the polymer polyol by the PFS, and (ii) from greater than about 5 up to about 100% by weight, based on 100% by weight of (i) and (ii), of polymer control agent that is added separately from the preformed stabilizer, to the preparation of the polymer polyol. In addition, the sum of the % by weight of polymer control agent (i) and the % by weight of polymer control agent (ii) totals 100% by weight of the total amount of polymer control agent. The difference between polymer control agent (i) and polymer control agent (ii) are explained in more depth below.

In the polymer polyols of the present invention, there are two potential and different sources of polymer control agent (PCA). These two different sources of polymer control agent account for 100% by weight of the polymer control agent present. It should also be noted, however, that the actual compound used as polymer control agent (i) may be the same or different than the actual compound used as polymer control agent (ii).

The first source of polymer control agent (i) is the preformed stabilizer. As previously described, the preformed stabilizers of the present invention can be prepared with or without a polymer control agent. The preformed stabilizer, with or without a polymer control agent, is then used to prepare the polymer polyol of the invention. Any polymer control agent that is used in the preparation of the preformed stabilizer is in turn "carried" or "transferred" by the PFS to the final product (i.e. the polymer polyol). Polymer control agent which is present in the PFS will inherently exist in the polymer polyol produced from this PFS. This polymer control agent (i) may be referred to as inherent PCA, PFS process PCA, or PCA from PFS.

The second source of polymer control agent (ii) in the polymer polyols of the present invention is any polymer control agent which is added separately to or used in the polymer polyol and/or the process of making the polymer polyol. In other words, polymer control agent (ii) includes all sources of polymer control agent, except that polymer control agent (i) which is carried to the polymer polyol by the PFS. Polymer control agent (ii) can be added as a separate component alone to the polymer polyol, added in combination with one or more other components which comprise the polymer polyol, or it can be blended with one (or more) of the other components (i.e. base polyol(s), ethylenically unsaturated monomer(s), and/or initiator(s)) in the preparation of the polymer polyol product. Obviously, it can not be blended or mixed with the PFS which used in the polymer polyol. This polymer control (ii) may be referred to as added PCA and/or fresh PCA.

The quantity of polymer control agent (ii) which may be employed in the present invention is greater than about 5.0% by weight, preferably at least about 8%, more preferably at least about 10% and most preferably at least about 25% by weight, based on 100% by weight of total polymer control agent. The added polymer control agent (ii) is also employed in amounts of less than or equal to 100% by weight, preferably less than or equal to about 85%, more preferably less than or equal to 80% and most preferably less than or equal to about 75% by weight, based on 100% by weight of total polymer control agent. The polymer control agent (ii) may be employed in any amount ranging between any combination of these lower and upper values, inclusive, e.g., from greater than about 5% to about 100% by weight, preferably from about 8% to about 85% by weight, more preferably from about 10% to about 80% by weight and most preferably from about 25% to about 75% by weight, based on 100% by weight of total polymer control agent. The sum of the % by weight's of polymer control agent (i) and of polymer control agent (ii) totals 100% by weight of the total quantity of total polymer control agent present.

The quantity of total polymer control agent to be employed in the present invention is greater than about 5.0% by weight, preferably at least about 5.2%, more preferably at least about 5.5% and most preferably at least about 6.0% by weight, based on the 100% by weight of all components which comprise the polymer polyol, prior to stripping the product, (i.e. components (A), (B), (C), (D) and (E)). The quantity of total polymer control agent is also employed in amounts of less than or equal to 20% by weight, preferably less than or equal to about 18%, more preferably less than or equal to 16% and most preferably less than or equal to about 15% by weight, based on the total weight of all components charged to the reactor. The amount of total polymer control agent may be employed in any amount ranging between any combination of these lower and upper values, inclusive, e.g., from greater than about 5.0% to about 20% by weight, preferably from about 5.2% to about 18% by weight, more preferably from about 5.5% to about 16% by weight and most preferably from about 6.0% to about 15% by weight, based on 100% by weight of total polymer control agent.

In addition, the polymer polyol and the process of preparing the polymer polyol may optionally comprise a chain transfer agent. The use of chain transfer agents and their nature is known in the art. Examples of suitable materials include compounds such as mercaptans including, e.g. dodecane thiol, ethane thiol, octane thiol, toluene thiol, etc., halogenated hydrocarbons such as, e.g. carbon tetrachloride, carbon tetrabromide, chloroform, etc., amines such as diethylamine, enol-ethers, etc. If used at all in the present invention, a chain transfer agent is preferably used in an amount of from about 0.1 to about 2 wt. %, more preferably from about 0.2 to about 1 wt. %, based on the total weight of the polymer polyol (prior to stripping).

The polymer polyols are preferably produced by utilizing a low monomer to polyol ratio which is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol.

The temperature range is not critical and may vary from about 100° C. to about 140° or perhaps greater, the preferred range being from 115° C. to 125° C. As has been noted herein, the catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.—a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor.

The polymer polyols of the present invention, after stripping, have a viscosity of less than or equal to:

$$V_b e^{(2.4x)} \text{ at } 25° \text{ C., wherein:}$$

$V_b$=viscosity of base polyol in centistokes (cSt), and

X=weight % of solids in polymer polyol/(100−weight % solids in polymer polyol).

The polymer polyols of the present invention comprise dispersions in which the polymer particles (the same being either individual particles or agglomerates of individual particles) are relatively small in size and, in the preferred embodiment, have a weight average size less than about ten microns. However, when high contents of styrene are used, the particles will tend to be larger; but the resulting polymer polyols are highly useful, particularly where the end use application requires as little scorch as possible.

Following polymerization, volatile constituents, in particular those from the PCA and residues of monomers are generally stripped from the product by the usual method of vacuum distillation, optionally in a thin layer of a falling film evaporator. The monomer-free product may be used as is, of may be filtered to remove any large particles that may have been created.

In the preferred embodiment, all of the product (viz. 100%) will pass through the filter employed in the 150 mesh filtration hindrance (filterability) test that will be described in conjunction with the Examples. This ensures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles. In addition, a significant amount of the polymer polyol passes the 700 mesh filtration hindrance test, as characterized more fully in the examples. It should be appreciated that the 700 mesh filtration hindrance test presents the most rigorous test of polymer polyol stability. Furthermore, it is the intent of the preferred embodiment of the present to produce PMPOs which have lower viscosities than PMPOs which are produced from the same components and relative amounts, except the use of less than 5% by weight of PCA.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples of this invention.

Polyol A: A sorbitol-started polyether polyol produced by reacting propylene oxide and ethylene oxide in the presence of potassium hydroxide catalyst and refining to remove the catalyst. The polyol has a hydroxyl number of 28.

Polyol B: A sorbitol-started polyether polyol produced by reacting propylene oxide and ethylene oxide in the presence of potassium hydroxide catalyst and refining to remove the catalyst. The polyol has a hydroxyl number of 28.

Base Polyol A: A glycerine initiated polyether polyol produced by reacting propylene oxide and ethylene oxide in the presence of a potassium catalyst and refining to remove the catalyst. The polyol has a hydroxyl number of about 36, and a viscosity of about 900 cSt.

Base Polyol B: A glycerine initiated polyether polyol produced by reacting propylene oxide and ethylene oxide in the presence of a potassium catalyst and refining to remove the catalyst. The polyol has a hydroxyl number of about 52, and a viscosity of about 520 cSt.

Polymer Polyol A: A SAN filled polyether polyol comprising about 43% by weight solids with the wt. ratio of styrene to acrylonitrile being about 63.5:36.5, wherein the base polyol is Base Polyol A.

Polymer Polyol B: A SAN filled polyether polyol comprising about 50% by weight solids with the wt. ratio of styrene to acrylonitrile being about 65:35, wherein the base polyol is Base Polyol B.

PCA: Isopropanol, a polymer control agent

SAN: Styrene:acrylonitrile

MDI: A methylene diphenyl diisocyanate based material having an NCO group content of about 33.6%, a functionality of 2, and containing about 57% by wt. of the 2,4'-isomer.

TMI: Isopropenyl dimethyl benzyl isocyanate (an unsaturated aliphatic isocyanate) sold as TMI® by Cytec Industries Catalyst A: A polyurethane amine catalyst suitable for foams, sold by Dow Chemical Company as NIAX Catalyst A-1

TAPP: tert-Amyl peroxy pivalate, a free-radical polymerization initiator commercially available from Akzo Chemie under the tradename Trigonox 125C75

Triganox 27: tert-Butyl peroxy diethylacetate, a free-radical polymerization initiator, commercially available from Akzo Chemie under the tradename Triganox 27

AIBN: 2,2'-Azobisisobutyronitrile, a free-radical polymerization initiator commercially available as VAZO 67 from E.I. Du Pont de Nemours and Co.

Viscosity: Viscosities were measured by Cannon Fenske viscometer (cSt)

Filtration Filterability is determined by diluting one part by

Hindrance weight sample (e.g. 200 grams) of polymer polyol (Filterability): with two parts by weight anhydrous isopropanol (e.g. 400 grams) to remove any viscosity-imposed limitations and using a fixed quantity of material in relative to a fixed cross-sectional area of screen (e.g. 1⅛ in. diameter), such that all of the polymer polyol and isopropanol solutions passes by gravity through a 150-mesh or 700-mesh screen. The 15-mesh screen has a square mesh with average mesh opening of 105 microns and it is a "Standard Tyler" 150 square-mesh screen. The 700-mesh screen is made with a Dutch twill weave. The actual screen used had a nominal opening of 30 microns. The amount of sample which passes through the screen within 1200 seconds is reported in percent, a value of 100 percent indicates that over 99 weight percent passes through the screen.

General Procedure for Macromers:

Macromer A: Prepared by heating Polyol A (100 parts), TMI (2 parts), MDI (1.5 parts) and 100 ppm stannous octoate catalyst at 75° C. for 2 hours.

Macromer B: Prepared by heating Polyol B (100 parts), TMI (2 parts), and 100 ppm stannous octoate catalyst at 75° C. for 2 hours.

Preformed Stabilizer (PFS) Preparation:

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120 ±1° C. The product from the second-stage reactor overflowed continuously through a pressure regulator designed to control the pressure in each stage at 65 psig. The pre-formed stabilizer then passed through a cooler and into a collection vessel. The preformed stabilizer formulations are disclosed in Table 1.

TABLE 1

Preformed Stabilizers A and B

|  | PFS A | PFS B |
|---|---|---|
| PCA type | isopropanol | isopropanol |
| PCA concentration in feed, wt-% | 60.0% | 60.0% |
| Macromer | Macromer A | Macromer B |
| Macromer concentration in feed, wt-% | 24.0% | 24.0% |
| Monomers concentration in feed, wt-% | 15.9% | 15.9% |
| Styrene/acrylonitrile ratio in feed, wt-% | 50/50 | 50/50 |
| Triganox 27 concentration, wt-% | 0.1% | 0.1% |

In the above table, the wt. % concentrations are based on the total feed.

Polymer Polyol Preparation:

This series of examples relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±1° C. The product from the second-stage reactor overflowed continuously through a pressure regulator designed to control the pressure in each stage at 45 psig. The polymer polyol then passed through a cooler and into a collection vessel. The crude product was vacuum stripped to remove volatiles. The wt-% total polymer in the product was calculated from the concentrations of monomers measured in the crude polymer polyol before stripping. Preformed stabilizers A and B were used to produce Polymer Polyols A and B, respectively.

Table 2A shows the composition of Polymer Polyol A, and Table 1B shows the composition of Polymer Polyol B.

TABLE 2A

Polymer Polyol A Formulations and Properties:

| Polymer Polyol A | Polymer Polyol A1 | Polymer Polyol A2 |
|---|---|---|
| Total Base Polyol A (% by wt.) | 57% | 57% |
| Solids - % by wt. (SAN ratio = 63.5:36.5) | 43% | 43% |
| PFS | PFS A | PFS A |
| % by wt. PFS | 6.9% | 6.9% |
| Fresh PCA (% by wt., based on Total PCA) | 0 | 58% |
| Total PCA* (% by wt.) | 4.16% | 10.15% |
| AIBN Initiator | 0.45% | 0.45% |
| Viscosity (cSt) | 5111 | 4797 |
| 700-mesh | 324 s | 258 s |

*These amounts are calculated amounts based upon the total weight of components.

TABLE 2B

Polymer Polyol B Formulations and Properties:

| Polymer Polyol B | Polymer Polyol B3 | Polymer Polyol B4 | Polymer Polyol B5 | Polymer Polyol B6 | Polymer Polyol B7 |
|---|---|---|---|---|---|
| Total Base Polyol B (% by wt.) | 49.8% | 49.8% | 50.11% | 49.9% | 50.1% |
| Solids - % by wt. (SAN ratio = 67:33) | 50.2% | 50.2% | 49.89% | 50.1% | 49.9% |
| PFS | PFS B | PFS B | PFS B | PFS B | PFS B |
| % by wt. PFS | 6.4% | 6.4% | 6.4% | 6.4% | 6.4% |
| Fresh PCA (% by wt. based on Total PCA) | 9.3% | 28.3% | 34% | 45% | 67% |
| Total PCA* (% by wt.) | 3.64% | 4.63% | 5.01% | 6.01% | 9.99% |
| AIBN Initiator | 0.25% | 0.25% | 0.25% | 0.25% | 0.25% |
| Viscosity (cSt) | 4928 | 4524 | 4446 | 4440 | 4160 |
| 700-mesh | 224 s | 203 s | 257 s | 240 s | 195 s |

*These amounts are calculated amounts based upon the total weight of components.

TABLE 2C

Polymer Polyol B Formulations and Properties:

| Polymer Polyol B | Polymer Polyol B8 | Polymer Polyol B9 | Polymer Polyol B10 |
|---|---|---|---|
| Total Base Polyol B (% by wt.) | 50.31% | 50.26% | 51.38% |
| Solids - % by wt. (SAN ratio = 65:35) | 49.69% | 49.74% | 48.62% |
| PFS | PFS B | PFS B | PFS B |
| % by wt. PFS | 6.4% | 6.4% | 6.4% |
| Fresh PCA (% by wt. based on Total PCA) | 34% | 34% | 67% |
| Total PCA* (% by wt.) | 5.01% | 5.01% | 10.00% |
| Initiator | TAPP | Triganox 27 | TAPP |
| % by wt. Initiator | 0.19% | 0.14% | 0.19% |
| Viscosity (cSt) | 4587 | 4959 | 4364 |
| 700-mesh | 265 | 226 | 260 |

*These amounts are calculated amounts based upon the total weight of components.

A temperature of 115° C. was used to prepare Polymer Polyols B8, B9 and B10.

In Tables 2A, 2B and 2C, SAN represents the concentration of SAN co-polymer in the PMPO product, while preformed stabilizer (PFS) and PCA refer to the concentration of these components in the feed to the PMPO reactor.

This next series of examples relates to the preparation of free-rise foams from Polymer Polyols prepared above as Polymer Polyols B3, B4, B6 and B7. Polymer Polyols B3, B4, B6 and B7 were used to prepare Foams B3, B4, B6 and B7, respectively. The basic formulation used to prepare Foams B3, B4, B6 and B7 follows. The polymer polyol, an amine catalyst (Catalyst A), water, and a silicone surfactant (L-620) were added to a one-half gallon cylindrical paper container fitted with baffles. The contents were mixed at 2400 rpm for 60 seconds with an agitator having two turbine impellers. The mixture was then degassed for 10 seconds. After degassing, the tin catalyst (K-29 from Goldschmidt) was added and the contents mixed at 2400 rpm for 10 seconds. While the mixer was still rotating, toluene diisocyanate was added and the contents mixed for 5 seconds. The mixture was then poured into a 14 by 14 by 6-inch cardboard box, where it rose freely until the reaction was complete. The foam was then heated in an oven at 225° C. for 5 minutes. Foam properties were determined according to ASTM Standard D-3574-66.

Foam Formulation:

| | |
|---|---|
| Polymer polyol B, pphp | 100 |
| Water, pphp | 2.3 |
| Catalyst A, pphp | 0.03 |
| Catalyst B, pphp | 0.10 |
| Surfactant A, pphp | 0.45 |
| TDI, pphp | 30.5 |
| Index | 115 |

TABLE 3

Foam physical properties

| Foam Properties | Foam B3 | Foam B4 | Foam B6 | Foam B7 |
|---|---|---|---|---|
| PCA*, wt. % | 3.64 | 4.63 | 6.01 | 9.99 |
| Density, lb/ft$^3$ | 2.51 | 2.56 | 2.48 | 2.51 |
| Air flow | 2.26 | 2.16 | 2.31 | 2.16 |
| IFD 25%, lb | 146.0 | 147.1 | 144.2 | 143.2 |
| IFD 65%, lb | 306.1 | 209.5 | 300.7 | 300.2 |
| 25% RET, lb | 88.0 | 91.6 | 89.2 | 88.5 |
| ASTM Tensile, psi | 32.5 | 33.2 | 29.8 | 27.1 |
| ASTM Elongation, % | 95.6 | 97.3 | 89.4 | 77.5 |
| ASTM Tear, psi | 2.89 | 2.16 | 2.39 | 1.98 |
| Compression set, % | 9.4 | 9.3 | 8.8 | 8.7 |

*These amounts are calculated amounts based upon the total weight of components.

A series of experiments were also performed to identify the effects of different initiators at different amounts on the viscosity of filterability of Polymer Polyols. The results are shown in Table 4.

TABLE 4

Comparison of Viscosity of PMPO's Prepared From Different Initiators at Different Amounts

| Polymer Polyol B | SAN Wt-% | Initiator | % by wt. Initiator | Fresh PCA (% by wt., based on Total PCA) | Total PCA* (% by wt.) | viscosity (cSt) | 700-mesh (s) |
|---|---|---|---|---|---|---|---|
| Polymer Polyol B3 | 50.2 | AIBN | 0.25% | 9.3% | 3.64 | 4928 | 224 |
| Polymer Polyol B4 | 50.2 | AIBN | 0.25% | 28.3% | 4.63 | 4524 | 203 |
| Polymer Polyol B5 | 49.89 | AIBN | 0.25% | 34% | 5.01 | 4446 | 257 |
| Polymer Polyol B8 | 49.69 | TAPP | 0.19% | 34% | 5.01 | 4587 | 265 |
| Polymer Polyol B9 | 49.74 | Triganox 27 | 0.14% | 34% | 5.01 | 4959 | 226 |
| Polymer Polyol B10 | 48.62 | TAPP | 0.19% | 67% | 10.00 | 4364 | 260 |

*These amounts are calculated amounts based upon the total weight of components.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable, low-viscosity polymer polyol having a solids content of at least about 30% by weight, based on the total weight of the polymer polyol, comprising the reaction product of:
   (A) a base polyol,
   (B) a preformed stabilizer,
   and
   (C) at least one ethylenically unsaturated monomer,
   in the presence of
   (D) a free-radical polymerization initiator,
   and
   (E) at least one polymer control agent;
wherein the total amount of polymer control agent present in the polymer polyol ranges from greater than about 5% up to about 20% by weight, based on the 100% by weight of the polymer polyol, with the total amount of polymer control agent comprising:
   (i) from about 0 to about 95% by weight, based on 100% by weight of (i) and (ii), of polymer control agent from the preformed stabilizer and which is carried into the polymer polyol by the preformed stabilizer,
   and
   (ii) from greater than about 5 to about 100% by weight, based on 100% by weight of (i) and (ii), of polymer control agent which is added separately from the preformed stabilizer.

2. The polymer polyol of claim 1, wherein (E) said polymer control agent comprises at least one alcohol.

3. The polymer polyol of claim 2, wherein (E) said polymer control agent comprises an alcohol which contains no more than 3 carbon atoms.

4. The polymer polyol of claim 2, wherein (E) said alcohol is selected from the group consisting of isopropanol, methanol and mixtures thereof.

5. The polymer polyol of claim 1, wherein the solids content is from about 30 to less than about 65% by weight.

6. The polymer polyol of claim 5, wherein the resultant stripped polymer polyol has a viscosity $\leq V_b e^{(2.4x)}$ at 25° C., wherein:
   $V_b$ = viscosity of base polyol in centistokes (cSt),
   and
   X = weight % of solids in polymer polyol/(100−weight % solids in polymer polyol).

7. The polymer polyol of claim 1, wherein the solids content is from about 40 to about 60% by weight.

8. The polymer polyol of claim 1, wherein (C) comprises a mixture of styrene and acrylonitrile.

9. The polymer polyol of claim 1, wherein at least one alcohol is present as part of polymer control agent (i), and/or polymer control agent (ii).

10. A polymer polyol blend comprising:
   (i) the polymer polyol of claim 1,
   and
   (ii) a polyether polyol having a functionality greater than or equal to 3 and a molecular weight of from about 500 to about 8,000,
wherein the resultant polymer polyol has a solids content of from about 5 to about 30% by weight.

11. The polymer polyol blend of claim 10, wherein the solids content is from about 10 to about 20% by weight.

12. A process for preparing a stable, low viscosity polymer polyol having a solids content of at least about 30% by weight, based on the total weight of the polymer polyol, comprising:
   (1) free-radically polymerizing:
      (A) a base polyol,
      (B) a preformed stabilizer,
      and
      (C) at least one ethylenically unsaturated monomer,
      in the presence of:
      (D) at least one free-radical polymerization initiator,
      and
      (E) at least one polymer control agent,
wherein the total amount of polymer control agent present in the polymer polyol ranges from greater than about 5% up to about 20% by weight, based on the 100% by weight of the polymer polyol, with the total amount of polymer control agent comprising:
   (i) from about 0 to 95% by weight, based on 100% by weight of (i) and (ii), of polymer control agent from the preformed stabilizer and which is carried into the polymer polyol by the preformed stabilizer, and (ii) from greater than about 5 to about 100% by weight, based on 100% by weight of (i) and (ii), of a polymer control agent which is added separately from the preformed stabilizer.

13. The process of claim 12, wherein (E) said polymer control agent comprises at least one alcohol.

14. The process of claim 13, wherein (E) said polymer control agent comprises an alcohol which contains no more than 3 carbon atoms.

15. The process of claim 14, wherein (E) said alcohol is selected from the group consisting of isopropanol, methanol and mixtures thereof.

16. The process of claim 12, wherein the solids content is from about 30 to less than about 65% by weight.

17. The process of claim 16, additionally comprising stripping the polymer polyol, wherein the resultant stripped polymer polyol has a viscosity $\leq V_b e^{(2.4x)}$ at 25° C. wherein:
$V_b$=viscosity of base polyol in centistokes (cSt), and
X=weight % of solids in polymer polyol/(100−weight % solids in polymer polyol).

18. The process of claim 12, wherein the solids content is from about 40 to about 60% by weight.

19. The process of claim 12, wherein (C) comprises a mixture of styrene and acrylonitrile.

20. The process of claim 12, wherein at least one alcohol is present as part of (i) and/or (ii).

21. A process for the preparation of a polymer polyol blend, comprising blending the polymer polyol produced by the process of claim 12, with a polyether polyol having a functionality of greater than or equal to 3 and a molecular weight of from about 500 to about 8,000, such that the resultant polymer polyol has a solids content of from about 5 to about 30% by weight.

22. The process of claim 21, wherein the resultant polymer polyol has a solids content of from about 10 to about 20% by weight.

23. A polyurethane foam comprising the reaction product of a polyisocyanate component with an isocyanate-reactive component wherein at least a portion of the isocyanate-reactive component comprises the polymer polyol of claim 1.

24. A process for the preparation of a polyurethane foam comprising reacting a polyisocyanate component with an isocyanate-reactive component wherein at least a portion of the isocyanate-reactive component comprises the polymer polyol of claim 1.

* * * * *